United States Patent [19]
Fevre

[11] Patent Number: 5,939,961
[45] Date of Patent: Aug. 17, 1999

[54] ELECTRIC SAFETY LOCKING DEVICE

[75] Inventor: Loic Fevre, Sanvignes les Mines, France

[73] Assignee: Robot Coupe (S.N.C), Montceau-les-Mines, France

[21] Appl. No.: 08/659,521

[22] Filed: Jun. 6, 1996

[30] Foreign Application Priority Data

Jun. 6, 1995 [FR] France .................................. 95 06653

[51] Int. Cl.⁶ ...................................................... H01H 9/00
[52] U.S. Cl. .................. 335/205; 307/113; 200/61.45 M
[58] Field of Search ........................... 335/151–3, 205–7; 200/61.45 M, 61.45 R, 61.53; 434/516, 620–2; 324/110; 307/119, 113

[56] References Cited

U.S. PATENT DOCUMENTS

| | | |
|---|---|---|
| 4,349,814 | 9/1982 | Akehurst . |
| 4,357,892 | 11/1982 | Sveinsbo et al. ...................... 340/624 |
| 5,239,202 | 8/1993 | Hostetler . |
| 5,311,068 | 5/1994 | Miller ..................................... 307/112 |
| 5,416,293 | 5/1995 | Reneau ............................ 200/61.45 R |
| 5,458,508 | 10/1995 | Sawada .................................. 335/205 |

FOREIGN PATENT DOCUMENTS

| | | |
|---|---|---|
| 2421483 | 11/1975 | Germany . |
| 3703859 | 9/1988 | Germany . |
| 2039175 | 7/1980 | United Kingdom . |
| 9013180 | 11/1990 | WIPO . |

OTHER PUBLICATIONS

French Search Report. Mar. 4, 1996.

*Primary Examiner*—Lincoln Donovan
*Attorney, Agent, or Firm*—Greenblum & Bernstein P.L.C.

[57] ABSTRACT

An electric locking device includes at least one main switch with a make contact, one secondary magnetic flexible leaf switch with a break contact, at least one auxiliary relay including at least one make contact, and an external control member comprising at least one permanent magnet. The main switch directly controls the relay coil after the secondary switch has been opened by the presence of a magnet in the control member, and the secondary switch, when it closes again, shorts the relay coil. This occurs when the control member and the magnet moves away. The assembly may be constructed such that the approach of the control member, by the presence of the magnet, first causes the opening of the secondary switch, then the closing of the main switch. The control member, during its retraction, releases the main switch that opens before the secondary switch closes. The secondary switch is never crossed by a current except in the case of a failure of the main switch, or during an attempt to tamper the locking device, causing the closure of the main switch without opening the secondary switch.

21 Claims, 4 Drawing Sheets

ELECTRIC SAFETY LOCKING DEVICE

BACKGROUND OF THE INVENTION

1. Field of the Invention

The object of the present invention is an electric safety locking device adapted in particular, but not exclusively, to machines driven by an electric motor. It results from the ever increasing requirements related to the machine safety and from the difficulty, in some cases, to equip a detachable protective member with a locking device acting according to the principle of positive mechanical action.

2. Background and Material Information

In a locking with positive mechanical action, a moving mechanical protective member necessarily drives another member, by direct contact or by means of rigid elements. It makes it possible to ensure the functioning of the locking device under any circumstances, which is rendered necessary by the standards regulating the machine safety.

However, there are situations where it is impossible, or sometimes not desired, to have a direct action of the protective member on its locking device, precisely during its opening state corresponding to the dangerous situation, either because the opening position of the protective member results in the mere retraction thereof, or because the environment and the use of the machine render this direct action impossible, or for both reasons all together. In particular, this type of situation is very frequent in the field of cooking apparatuses where the protective members usually are lids that it is indispensable, for reasons related to hygiene and utilization, to be able to remove very easily and completely from their machine in order to clean them.

In such situations, an extremely simple electric safety device includes using, for example, either a magnetic switch, so-called FLS (flexible leaf switch, or REED switch), or a Hall effect detector, then constituting a magnetically controlled electronic switch, or a conventional mechanically controlled hard contact switch whose opening, in the absence of the protector, is ensured by an auxiliary mechanical element, such as a spring, for example, or by the effect of gravity forces, or by any other means. In each of these cases, the switch is linked to the frame of the machine and is closed under the effect of a magnet for the two first cases, and of an adapted mechanical element for the third case.

The magnet or the mechanical member are linked to the protector such that they cause the closure of the switch only when the protector is in its safe position. The opening or retraction of the protector cause the re-opening of the switch, except in the case of failure thereof, which results in the machine being stopped. These three types of switches are widespread.

However, they are not the only ones available for use. There are other devices that make it possible to detect the presence of the protective member, and to permit the operation of the machine. One can cite, for example, the inductive sensors, the optical or infrared systems, or the systems with an oscillating coil.

SUMMARY OF THE INVENTION

All of these devices pose the same problem: it is impossible to guarantee that the machine will be prevented from functioning during the retraction of the protector, in the case of a failure of the sensitive member or of one of its components. To understand the contribution of the present invention, it is advisable to describe what the magnetic flexible leaf switches are, and to define the conditions of their high reliability.

A magnetic flexible leaf switch (FLS or REED) is constituted of a glass tube, sealed at each end, filled with a controlled atmosphere, including, in the axis, two flexible leaves made of a magnetic metal, one at each end, that partially overlap one another in the middle of the tube without touching each other. These leaves carry a metal coating on the opposing surfaces. The two leaves come into contact with one another under the effect of a suitable magnetic field. If the magnetic field that maintains the two leaves closed decreases sufficiently, they will separate abruptly by elasticity and will close again only for a much greater field.

The moving masses (leaves) are very weak and their displacements very short. The latter occur in the complete absence of rotations or frictions. The leaves are of the same kind, and there is no intermediate element made of a different metal. These switches do not include any mechanical element susceptible of wear and tear, which provides them with a mechanical life of several billion operations. In this sense, they constitute excellent safety elements.

However, the passage from one state to another (open to close, and vice-versa) is not instantaneous, and occurs progressively during a time on the order of a few tens of nanoseconds. This generates a wear and tear of the contacts coming from the electric energy that degrades at the level of these contacts during this short period of time. This physical phenomenon lead irremediably to the gluing (suppressible by mechanical shock), then to the welding of the two blades. This deficiency determines the life of the switch. The latter is directly related to the voltages, currents and to the nature of the electric charges that are switched over. However, this type of deficiency is not specific to magnetic switches. It is also feared for conventional hard contact switches in which the pulling of the contacts is not obtained by the principle of a positive opening operation.

In view of their small power, the magnetic switches are often used to control more powerful auxiliary relays or contactors. These relays constitute inductive charges that are particularly harmful to the contacts of the magnetic switch. Thus, it is not rare to note a lifetime only ranging from a few hundreds to a few tens of thousands of operations.

In the absence of an extremely precise care to the electrical design of the circuit, the use of a magnetic switch as sole safety element is not satisfactory. Likewise, the solution using a conventional switch is not acceptable since in this case, one cannot guarantee the re-opening thereof in the case of welding of its contacts, if the return member (spring) were to fail (broken coil).

Finally, the solution that is known to utilize a Hall effect detector, which has a long operating life, is, however, no more reliable because the latter is a solid-state component and runs the risk of a short-circuit failure due to its very own nature, under the effect of a surge, for example.

A device with a position detector without direct contact including two switches, one including a make contact, the other a break contact has, already been proposed in the document No. DE-A1-37 08 859. Each of these two switches controls a relay as well as an auxiliary relay through which the three relays act and rest in a predetermined order. They each have one of their contacts connected together in series to constitute the external control circuit. The approach of the control magnet causes the closing of the make contact then the opening of the break contact. This particular sequence is recognized by a combinatorial logic circuit associating the three relays. This self-monitoring circuit detects the proper progress of the sequence of the two switches and blocks the output in the case of an anomaly. However, a failure of the make contact is detected only during the following cycle. Such a device efficiently ensures the reliability of the two switches and, therefore, can be used as a locking means with confidence. However, the known embodiments of this invention use a coded magnet, including, on the same surface, at least two opposing magnetic poles.

This particularity proves impossible to use for machines where the magnet does not control the switch directly, but rather by means of a magnetic bar. This is particularly the case when the protector is functional member that is very remote from the frame of the machine that carries the magnetic switch. The bar can only lead the magnetic flux in a single direction and renders the coded magnet device inoperative. Another limitation of this device is the necessity to be fed by a continuous voltage that is indispensable for the functioning of the combinatorial logic. In addition, and this is the main disadvantage, the necessity for the three relays and the elements constituting the combinatorial logic renders this device extremely expensive.

SUMMARY OF THE INVENTION

The object of the present invention is to palliate these disadvantages and to propose a simple and economical solution for making reliable electric locking devices when it impossible to satisfy the principle of positive mechanical action.

According to the invention, the electric locking device includes at least one main switch with a make contact, one secondary magnetic flexible leaf switch with a break contact, at least one auxiliary relay including at least one make contact, and an external control member comprising at least one permanent magnet. The main switch directly controls the relay coil after the secondary switch has been opened by the presence of a magnet in the control member, and the secondary switch, when it closes again, shorts the relay coil. This occurs when the control member and the magnet moves away. The assembly may be constructed such that the approach of the control member, by the presence of the magnet, first causes the opening of the secondary switch, then the closing of the main switch. The control member, during its retraction, releases the main switch that opens before the secondary switch closes. The secondary switch is never crossed by a current except in the case of a failure of the main switch, or during an attempt to tamper the locking device, causing the closure of the main switch without opening the secondary switch.

In a general manner, the main switch including a make contact is a safety switch of which the control is dependent upon the position of a mechanical member, the secondary switch making it possible to overcome any dangerous failure of the switch.

BRIEF DESCRIPTION OF DRAWINGS

Other characteristics and advantages of the invention will become apparent along the following description of the particular embodiments that are only provided by way of non-limiting examples, with reference to the annexed drawings, in which.

DETAILED DESCRIPTION OF THE PREFERRED EMBODIMENTS

Figure 1:
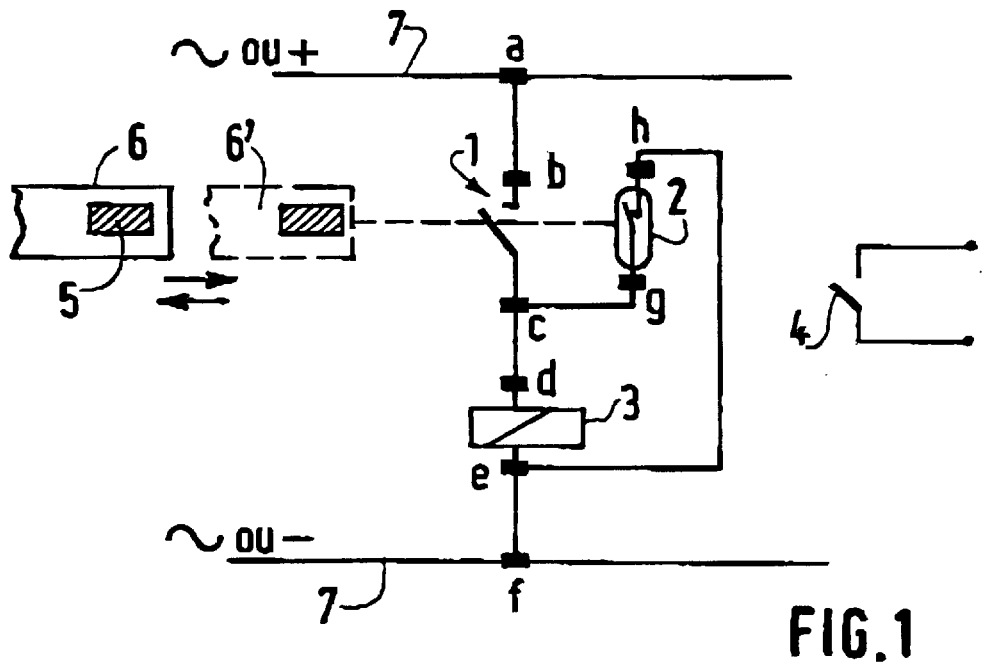
FIG. 1 is a block diagram of the invention.

According to the present invention, the locking circuit includes, in its simplest version, schematically shown in FIG. 1, at least one main switch 1 with a make contact, one secondary magnetic flexible leaf switch 2 with a break contact, and at least one auxiliary relay 3 including a coil that acts on a contact 4. The device is completed by an external control member 6 including, among others, at least one permanent magnet 5.

The main switch 1 is mounted in series with the coil of the auxiliary relay 3 between the feed lines 7. The leaf switch (secondary switch) 2 is connected in parallel with the coil. The switch 1 directly controls the relay that includes at least one contact 4, which sends the on or off signals at the level of the output. In the case of small power machines, the contact(s) 4 can control the machine directly.

The mechanical control member 6 including the magnet 5 is constructed such that in its approach movement, it first causes the opening of leaf switch 2, then the closing of switch 1 (position 6'). In its retraction movement, it first releases switch 1, which is normally open, then releases leaf switch 2 which, by construction, is biased to normally close.

Three cases pertaining to safety can then occur:

During the retraction of the control member 6, the switch 1 may open up, the relay 3 falls back down and the contact 4 is open. This is the expected normal functioning During the retraction of the control member, the switch 1 may remain closed (e.g., by adhesion, welding or failure of its return element, if such element exist 5). In this case, the contact of leaf switch 2, which returns to its normally closed position, brings the voltage back to zero at the terminals of the coil of the auxiliary relay 3. The relay 3 falls back down and the contact (output) 4 is then opened.

During the approach of the control element, the contact of leaf switch 2 remains closed (e.g., by adhesion or welding). In this case, switch 1 which subsequently closes does not give the on signal to the output since the coil of the relay 3 is short-circuited by leaf switch 2.

It must be noted that this latter case is extremely unlikely because the leaf switch 2 is never crossed by a current, except in the case of a failure of switch 1. The mechanical life of several billion operations, usually observed for the magnetic flexible leaf switches, is then found again for the leaf switch 2. In any event, a possible failure of leaf switch 2 is never dangerous.

In the second case, which is the type of failure to protect against, it must be noted that the closure of the contact of leaf switch 2 must not be dependent upon any mechanical or elastic return element prone to fracture, jamming or any other anomaly. Only a magnetic flexible leaf switch provides this feature due to its very own nature.

Figure 2:
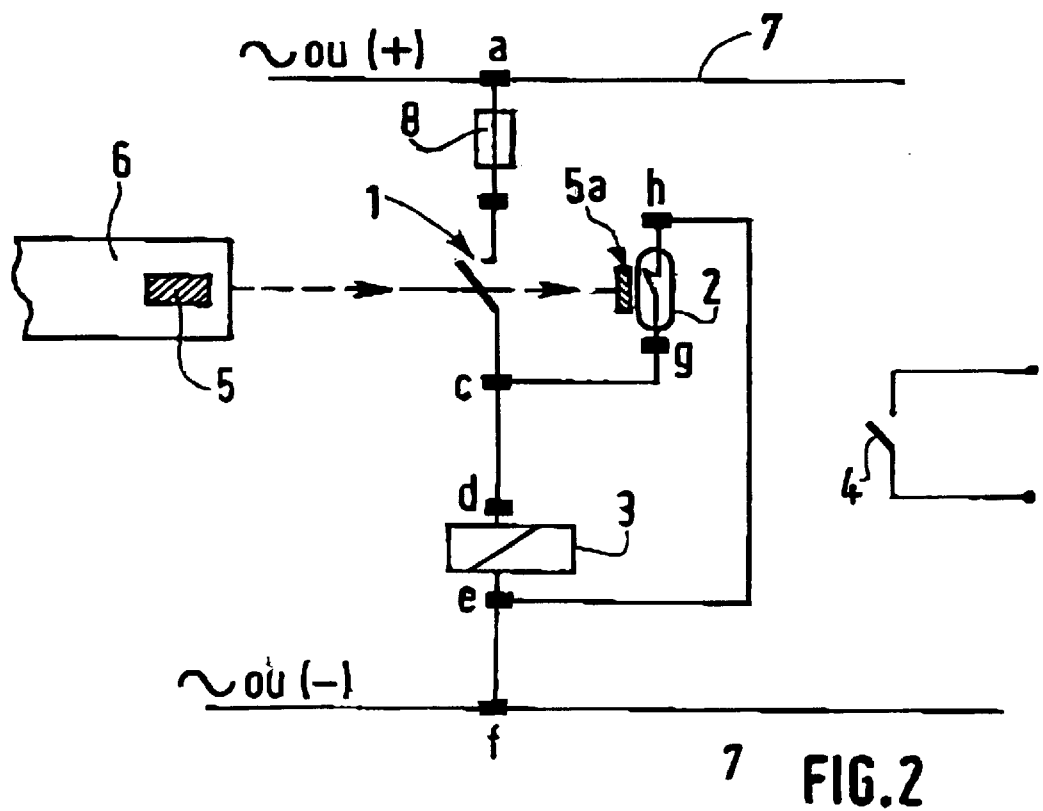
FIG. 2 is an alternative embodiment.

With respect to magnetic leaf switch 2, no distinction is made between a magnetic switch including, at least one break contact, i.e., a magnetic switch with a reverse contact and whose make contact would be left "in the air", and where only the break contact would be exploited and a conventional magnetic switch including a single make contact that is transformed into a break contact by the effect of a small auxiliary magnet 5a shown in FIG. 2, such that they constitute, together, a magnetic switch with a break contact controlled by the main magnet 5 associated with the control member 6. In this latter case, it is advisable to specify that the main magnet 5 must be oriented in consistent manner with respect to the auxiliary magnet 5a. Indeed, in the absence of resistance of the magnetic fluxes of the two magnets, the approach of the control magnet would not open the contact of 2, and the system would be inoperative. This constraint can be exploited to facilitate the control of the tampering of the locking system, whenever necessary.

There is only one case where the efficiency of the device could be questioned. That is where the continuity of the electric circuit between the points c and g (FIG. 1) or between the points h and e would no longer be ensured. The discontinuity may be due to either a break, accidental or not accidental, of the electrical connections between these points or a melting of one of the conductors ensuring these connections, following the short-circuit caused by the auxiliary switch 2 during a failure of the main switch 1. Indeed, in this case, the shorting of the coil of the relay 3 by the switch 2 is not ensured.

The present invention provides a response to these two possible causes. When a melting is feared, in view of the supply power, for example, a fuse 8 is added to the circuit between the points a and b, as indicated in FIG. 2. The fuse is selected to withstand the current necessary to the supply of the relay 3, and to be destroyed during the short-circuit caused by the switch 2 upon the first failure of the switch 1. The destruction of the fuse makes it possible to render the system inoperative as soon as the first flaw appears. It also makes it possible to avoid any overload of the main switch 1.

Figure 3:
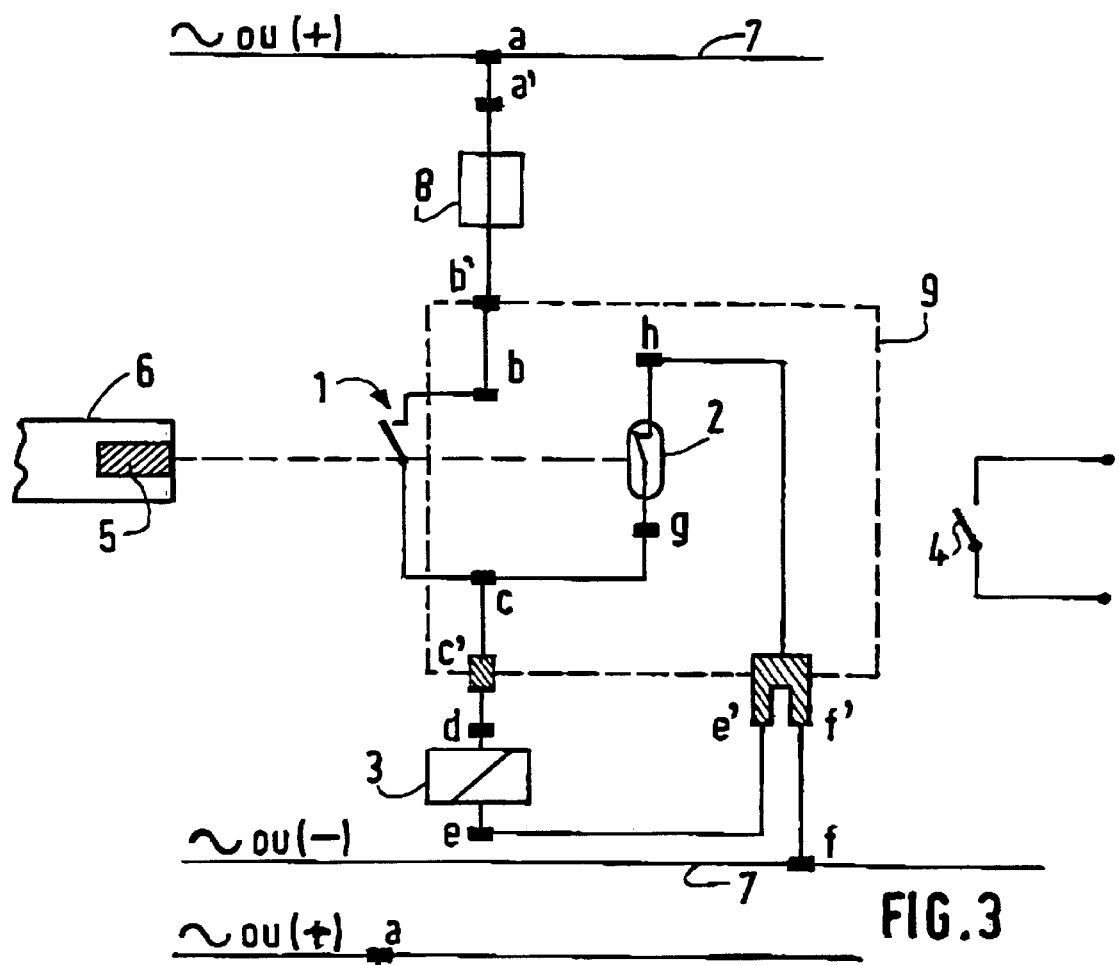
FIG. 3 is an assembly using an overmolded casing.

When a break of the electrical connection, which is independent of a failure of switch 1, is feared, it is possible:
   to transform the electrical connection e-f (FIG. 1) into a connection e-e' followed by a connection f'-f, where e' and f' are two points of a same terminal likewise connected to h, as shown in FIG 3.
   to build the circuit according to FIG. 3, at least the secondary switch 2, the electrical connection c-g, and the electrical connection h-e' are integrated into a sealed casing 9. Sealed casing 9 may be filled with an overmolding resin in order to impart a permanent integrity to the electrical connections which it contains. Under these circumstances, the break of any connection exterior to the overmolded casing, cuts off the supply to the relay, and the output 4 remains open such that the machine is not supplied.

Other variations of construction may include integrating, into the overmolded casing, all or part of the other components of the device, i.e., the main switch 1, when its control principle allows it (e.g., control without direct contact), auxiliary relay 3, and fuse 8, when applicable.

Figure 4:
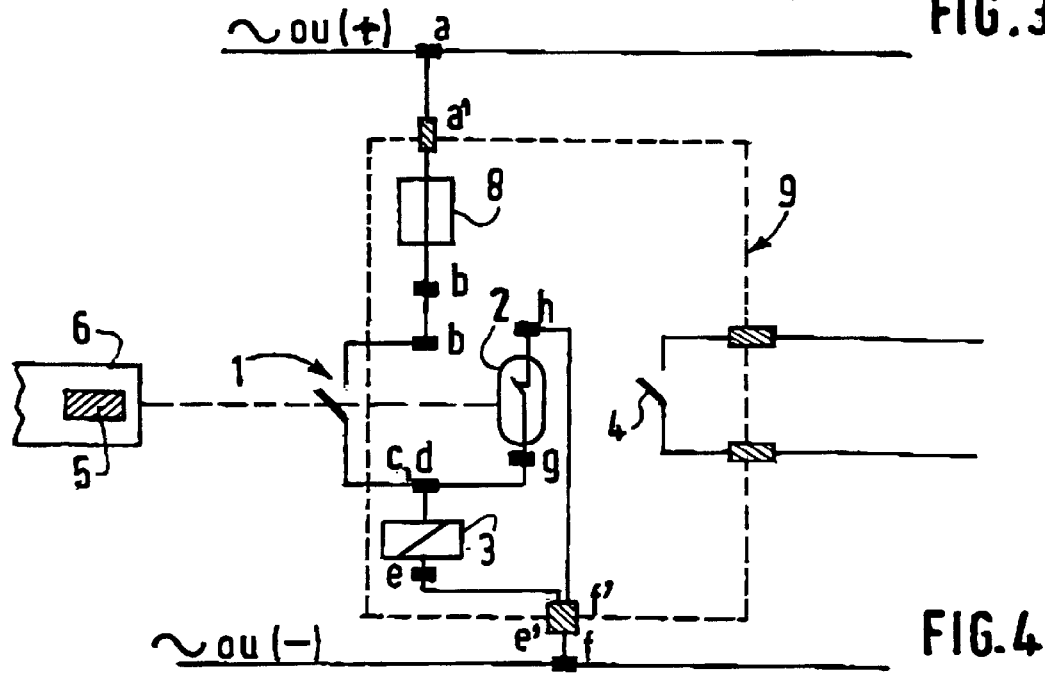
FIG. 4 is another embodiment in which the components are integrated in a casing.

It must be noted that if the fuse 8 is integrated into the overmolding 17 (see FIG. 6), it makes it possible to render the device definitely inoperative after it possible break. This can be sought particularly when one considers that the first failure is an obvious sign of wear and tear of the main switch 1, and that it is preferable to replace the entire device immediately for a durable operation of the machine. The variation of construction that consists of integrating the relay, as well as the fuse, into the overmolded casing makes it possible to have a self powered compact module which it only remains to supply. This is what is shown in FIG. 4.

As has been indicated previously, no distinction is made in the present invention between the various types of switches that are usable for the main switch 1.

However, it is advisable to note that a magnetic flexible leaf switch or a conventional hard contact switch makes it possible to feed the device directly from the alternating voltage of the network, for example, 115, 230 or 400 volts. Such a switch enables the user to obtain a reliable electric locking system that is very simple and extremely inexpensive with respect to any other system known to date.

Figure 5:
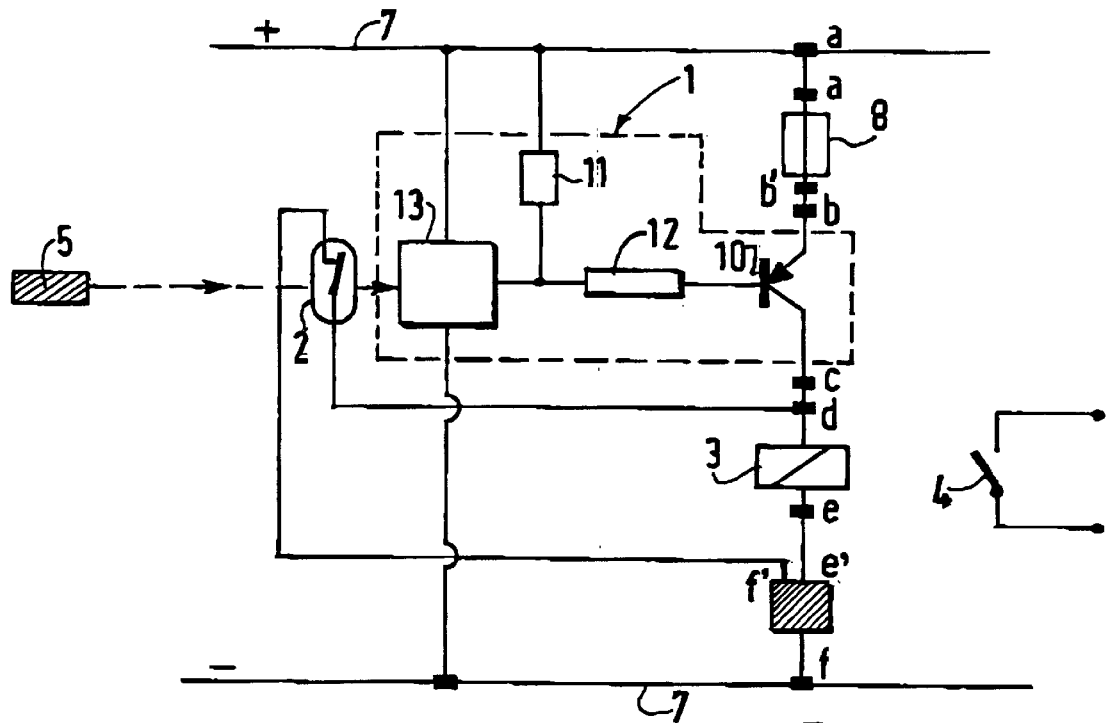
FIG. 5 is another embodiment using a first Hall effect detector.

FIG. 5 shows an assembly including a Hall effect detector 13. The choice of a Hall effect detector for the switch 1 requires that the supply be carried out from a very low direct voltage. In most cases, it is also necessary to amplify the output of this type of detector by means of a transistor 10 to enable the control of the relay. An embodiment is indicated in FIG. 5 where 11 and 12 are two resistances with appropriate values for the polarization of the transistor. In this case, the control member can be reduced to a single magnet 5. The detector 13 is selected to be magnetically much less sensitive than the switch 2, so as to obtain the necessary shift between their respective operations.

Figure 6:
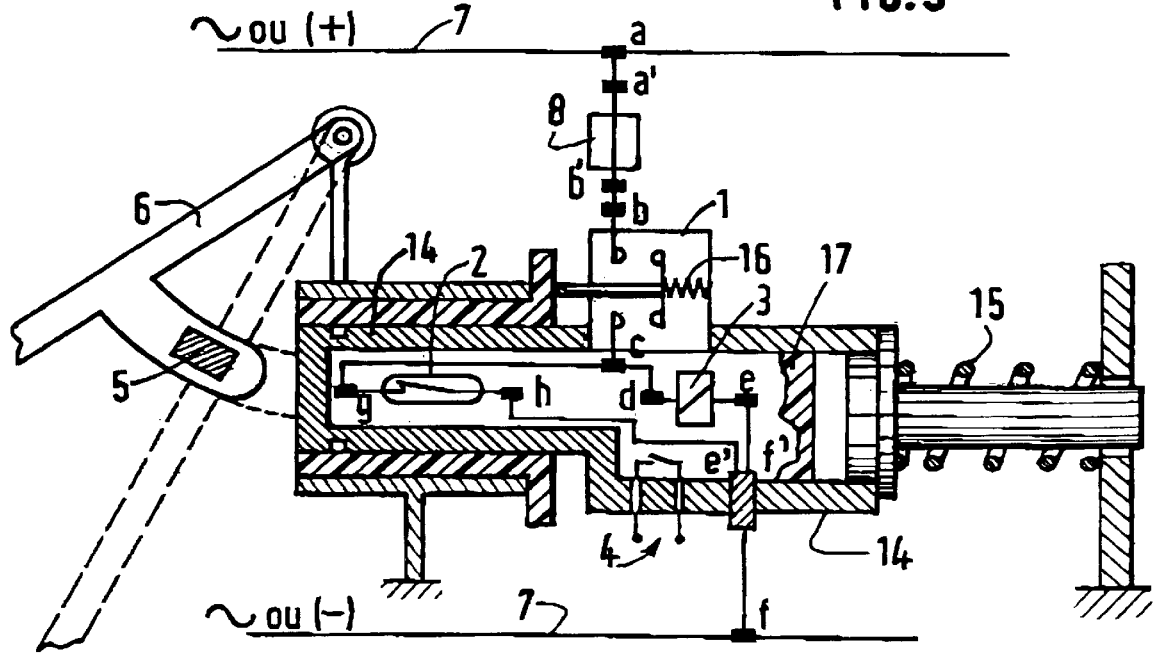
FIG. 6 is a device for mechanically controlling the main switch.

Another important characteristic of a locking device is the difficulty to tamper with it. To achieve this object, it may be suitable to select, for the main switch 1, an operation mode involving efforts that are impossible to produce manually without using the protective member. A particular embodiment is schematically shown in FIG. 6.

In this embodiment the switch 2 is housed in a movable hollow shaft 14 that also carries the switch 1 and the relay 3. The shaft 14 slides in translation with respect to the frame of the machine and is displaced by the control member 6 connected the protector, when the latter closes. The shaft 14 is brought back rearwardly by a spring 15, when the protector opens. In its forward motion, the shaft drives the switch 1, which releases its thrustor and permits the closure thereof by spring 16. In its rearward motion, the shaft brings the thrustor of 1 in support on the frame, which causes the reopening thereof. The protector drives the control member 6 that carries the magnet 5 which opens the switch 2 before the switch 1 can close. Likewise, during the retraction of the protector, the magnet releases the switch 2 after the switch 1 is reopened.

This type of construction has numerous advantages: the protector, if journalled for example, can reduce the operator's effort such that the spring 15 can be selected to exert a very substantial force which will guarantee the opening of the switch 1, even in the case of welded contacts, if main 1 selected is selected to be of the type with a positive operation for opening its contact elements, and which will prevent any operation of the shaft other than with the protector. In addition to ensuring the locking in the case of a failure of spring 15, the presence of the switch 2 makes it possible to reduce the possibilities of fraud.

The shaft 14 can carry a joint that makes it possible to render the device impervious with respect to the exterior of the frame, which is particularly sought in the field of food cooking apparatuses. The shaft 14 can also be used as a casing and receive, in addition to the switch 2, the electrical connections c-g and h-e', possibly the relay 3, the control output 4 and the fuse 8, as well as an overmolding resin 17 with the previously described advantages.

Figure 7:
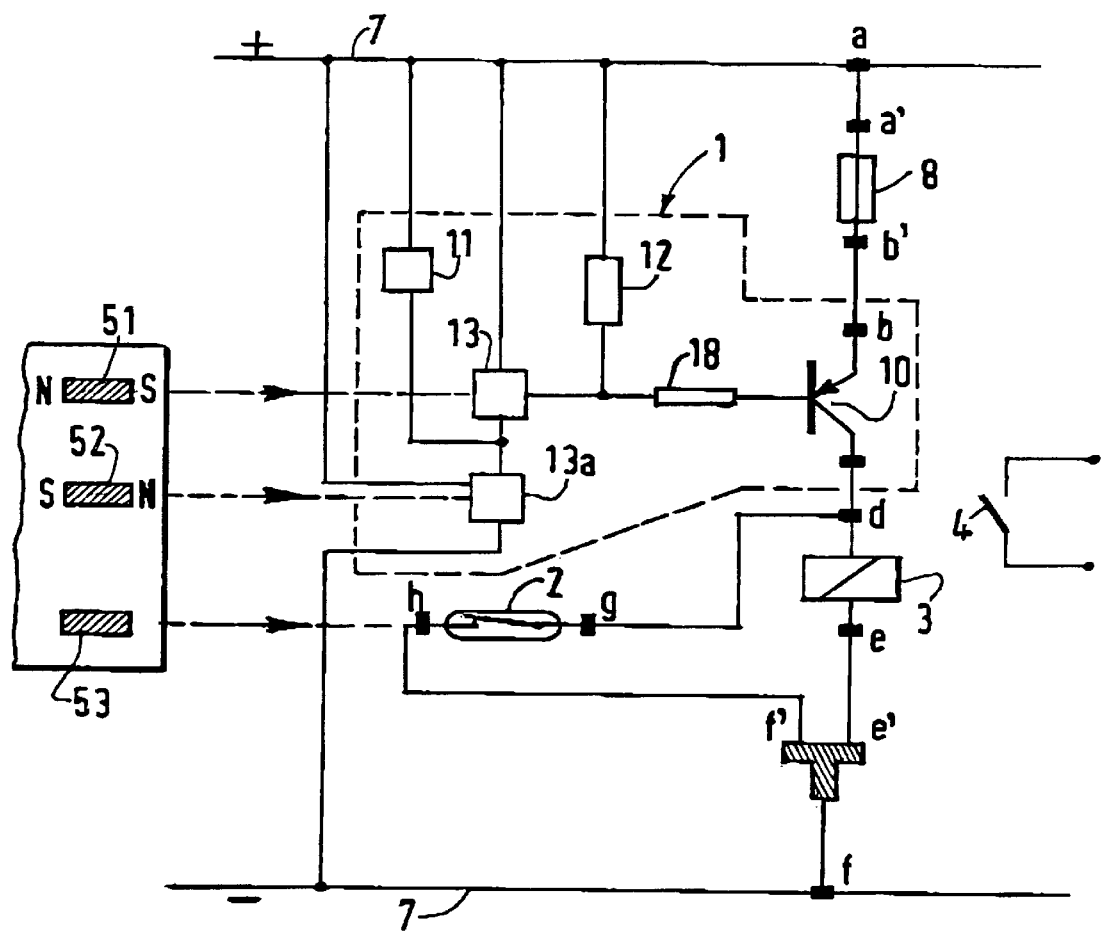
FIG. 7 is another assembly having two Hall effect detectors.

Another possibility of fraud control may include fabricating the switch from two unipolar Hall effect detectors 13 and 13a such as shown in FIG. 7. The two detectors are arranged in the reverse direction with respect to their control, and are connected in series with respect to their electric output. In this case, the control member 6 carries at least two, but preferably three magnets, 51, 52, 53. The magnet 51 controls the Hall effect detector 13, magnet 52 controls Hall effect detector 13a, and magnet 53 controls the switch 2. If Hall effect detector 13 is arranged to be controlled by a south magnetic pole, Hall effect detector 13a will be oriented to be controlled by a north magnetic pole, and vice versa. The three magnets 51, 52, 53, the two Hall effect detectors 13, 13a, and switch 2, are arranged such that in the approach movement of the control member 6, the magnet 53 opens the switch 2 before the magnets 51 and 52 control the output of the detectors 13 and 13a, respectively. The transistor 10 is polarized by the resistances 11, 12 and 18.

This embodiment renders fraud extremely difficult because the approach of a magnet can only control a single detector at a time, and the output is not permitted. Even if a user were to bring two magnets close together, with their poles suitably oriented to control the two hall effect detectors, the systematic break of the fuse, caused by the failure to open 2, would completely discourage this attempt.

In addition, the control member can easily integrate the magnets without rendering them visible. The magnetically sensitive elements can be masked by the overmolded casing such that it is impossible to know the position, the number, or the proper orientation to be provided for the magnets in order to tamper with the locking device.

Of course, numerous variations can be provided, especially by substituting equivalent technical means, without leaving the scope of the invention.

The instant application is based upon French patent application no. 95.06653, filed on Jun. 6, 1995, the disclosure of which is hereby expressly incorporated by reference thereto in its entirety and the priority of which is claimed under 35 USC 119.

What is claimed is:

1. An electric locking device comprising:
   at least one main switch with a make contact;
   a secondary magnetic flexible leaf switch with a break contact;
   at least one auxiliary relay including at least a make contact;
   an external control member including at least one permanent magnet;
   said main switch directly controlling a coil of said relay after said secondary magnetic flexible leaf switch has been opened by the presence of said at least one permanent magnet in said control member; and
   said secondary magnetic flexible leaf switch closes when said control member moves away, and shorts said coil of said relay;
   said device being constructed such that an approach of said control member causes said secondary magnetic flexible leaf switch to open and said at least one main switch to close, and a retraction of said control member releases said at least one main switch to open before said secondary magnetic flexible leaf switch closes again.

2. A device according to claim 1, further comprising a fuse positioned between said at least one main switch and a supply side not directly connected to said relay coil.

3. A device according to claim 1, said secondary magnetic flexible leaf switch comprising a magnetic flexible leaf switch with a reverse contact in which a non-common terminal of the make contact is in "the air".

4. A device according to claim 1, said secondary magnetic flexible leaf switch comprising a magnetic flexible leaf switch with a make contact transformed into a switch with a break contact by a presence of an auxiliary magnet.

5. A device according to claim 2, said secondary magnetic flexible leaf switch comprising a magnetic flexible leaf switch.

6. A device according to claim 3, said at least one main switch comprising a Hall effect detector whose signal is amplified by a transistor.

7. A device according to claim 3, said secondary magnetic flexible leaf switch comprising a hard contact switch of a type having a positive operation for opening its contact elements.

8. A device according to claim 5, said secondary magnetic flexible leaf switch and associated electrical connections are imperviously encased within an overmolding resin.

9. A device according to claim 3, said secondary magnetic flexible leaf switch integrated with at least associated electrical connections in a shaft, said shaft being movable between an external control member and a spring wherein movement of said shaft causes opening and closing of said secondary magnetic flexible leaf switch.

10. A device according to claim 3, said secondary magnetic flexible leaf switch comprising a circuit including two unipolar Hall effect detectors connected in series and arranged so as to be controlled by two opposing magnetic poles.

11. A device according to claim 3, said secondary magnetic flexible leaf switch and at least associated electrical connections are integrated into an overmolded impervious casing.

12. A locking device comprising:
    a main switch and a relay coil arranged for actuating a contact;
    a secondary switch;
    a control member, actuating said secondary switch and said main switch, to enable current flow through said relay coil;
    said control member actuating said secondary switch prior to actuating said main switch.

13. The locking device according to claim 12, said main switch comprising a normally open switch actuated by mechanical movement; and
    said secondary switch comprising a normally closed switch actuated by a magnetic field.

14. The locking device according to claim 12, said control member comprising a magnetic member for actuating said secondary switch.

15. The locking device according to claim 12, further comprising a destructible fuse for failing when said main switch and said secondary switch are simultaneously closed.

16. The locking device according to claim 12, said control device comprising a magnetic member for actuating said main switch and said secondary switch.

17. The locking device according to claim 16, said main switch comprising a magnetic sensor and said secondary switch comprising a magnetic leaf switch;
    said magnetic sensor arranged to be less sensitive to a magnetic field than said magnetic leaf switch.

18. The locking device according to claim 16, said magnetic member comprising a plurality of magnets;
    said main switch comprising a plurality of magnetic sensors;

each magnetic sensor corresponding to a respective one of said plurality of magnets; and an additional one of said plurality of magnets for actuating said secondary switch.

19. The locking device according to claim 18, said plurality of magnetic sensors comprising a first and second magnetic field sensor, said first magnetic field sensor arranged to sense a south magnetic pole and said second magnetic field sensor arranged to sense a north magnetic pole.

20. The locking device according to claim 16, said plurality of magnets corresponding to said plurality of magnetic sensors arranged so that a magnetic north field and a magnetic south field are sensed by said plurality of magnetic sensors.

21. An electric locking device comprising:

at least one main switch with a make contact having at least one terminal;

a secondary magnetic flexible leaf switch with a break contact;

an external control member including at least one permanent magnet being adapted to selectively open and close said at least one main switch and said secondary magnetic flexible leaf switch;

a relay having a coil with two terminals;
said at least one terminal of said at least one main switch being coupled in series with said coil and being adapted to control said coil after said secondary magnetic flexible leaf switch has been opened by the presence of said at least one permanent magnet;

said secondary magnetic flexible leaf switch being coupled to the terminals of said coil and being adapted to short circuit said coil when said at least one permanent magnet is one of moved away from and not within a vicinity of said secondary magnetic flexible leaf switch;

said at least one permanent magnet being movable and being adapted to effect an opening of said secondary magnetic flexible leaf switch and then a closing of said at least one main switch when said at least one permanent magnet approaches said secondary magnetic flexible leaf switch, and said at least one permanent magnet being adapted to effect an opening of said at least one main switch and then a closing of said secondary magnetic flexible leaf switch when said at least one permanent magnet moves away from said secondary magnetic flexible leaf switch, wherein a current flows through said secondary magnetic flexible leaf switch only when said at least one main switch has failed.

\* \* \* \* \*